Patented Sept. 11, 1934

1,973,499

UNITED STATES PATENT OFFICE 1,973,499

TREATMENT OF HYDROCARBON OILS

Jacque C. Morrell, Chicago, Ill., assignor to Universal Oil Products Company, Chicago, Ill., a corporation of South Dakota No Drawing. Application November 22, 1930, Serial No. 497,613

1 Claim. (Cl. 196—24)

This invention relates to the treatment of hydrocarbon oils, and refers more particularly to the treatment of hydrocarbon oil mixtures containing relatively high amounts of those of gasoline boiling point range produced by the cracking of relatively heavier hydrocarbon oil mixtures under conditions of heat and pressure.

More specifically, the invention contemplates the use of reagents in two or more stages, the first step being produced by reagents which combine with or remove undesirable components or constituents of the oil and the second step consisting in removal of products of the first reaction containing undesirable constituents that have resulted from the reactions of condensation or polymerization of undesirable components such as sulfur compounds.

In a preferred embodiment of the invention, hydrocarbons, e. g., cracked distillates or relatively high sulfur content, are treated with halogens, halogen acids, or metallic halogen compounds, the general tendency of these reactions being toward the condensation of sulfur-containing molecules into molecules of higher molecular weight with the attendant elimination of some sulfur as hydrogen sulfide, or other sulfur derivatives, and the addition of halogens either to these same molecules or to others of a hydrocarbon nature.

I have found by the use of such reagents as chlorine, bromine, iodine or fluorine and their hydrogen derivatives such as hydrogen chloride, bromide, iodide and fluoride and their metallic derivatives such as those of aluminum, iron, tin, zinc, or combinations thereof, et cetera, as preliminary treating agents that there is a desulfurization with the attendant production of halogen compounds, these latter compounds being produced in amounts approximately equivalent to the degree of desulfurization.

When the oil thus treated is suitably washed to remove traces of the first reagents and then subjected to the action of dehalogenating substances there is further desulfurization along with removal of the chlorine content. The mechanism of these reactions is not entirely known though the results obtained are definite. In some cases the halogen, e. g., chlorine, may in the course of the condensing reactions of the first stage replace either sulfur or hydrogen in the molecules with the formation of such transition products as chlorides of sulfur, hydrogen chloride, et cetera. Other types of reactions which may occur are those between hydrogen liberated when chlorine substitutes hydrogen in hydrocarbons, the nascent hydrogen then reacting with the sulfur in the sulfur compounds to produce hydrogen sulfide. For dehalogenating such reagents as sodium, calcium, iron and copper may be used, also the oxides and hydroxides of these or other metals and such special reagents as sodamide. The dehalogenation is carried on preferably at elevated temperatures and in the case of the hydroxides or low melting point metals the dehalogenating agent is preferably in a molten state. Mixtures of these substances may also be used.

As an example of a treatment falling within the scope of the invention a cracked naphtha containing 0.4% sulfur was treated with 2% by weight of anhydrous ferric chloride, the treatment being conducted at temperatures and pressures slightly above atmospheric. The sulfur content as a result of this first treatment was reduced to 0.2% with the attendant fixation of .15% of chlorine. Upon further treatment of the oil with either sodium or sodamide, the chlorine was reduced to 0.02% and the sulfur content further reduced to 0.1%.

In another case when the oil is treated directly with chlorine and dehalogenated by treatment with molten sodium hydroxide or a mixture thereof with potassium hydroxide, a reduction in sulfur of from 0.5% to 0.17% may be observed. In still another example, when treating oil with hydrogen fluoride and subsequently with molten sodium the sulfur may be reduced from 0.4% to 0.2%.

The above examples are illustrative of some of the possibilities of the invention and are not to be construed as limitations thereof.

I claim as my invention:

Steps in a process of desulphurizing distillates produced in the cracking of hydrocarbon oils, which comprise subjecting said distillate to reaction in the presence of a compound containing a halogen and thereafter subjecting the distillate to treatment with a molten alkali metal to remove the halogen.

JACQUE C. MORRELL.